US011248337B2

(12) United States Patent
Lyons et al.

(10) Patent No.: US 11,248,337 B2
(45) Date of Patent: Feb. 15, 2022

(54) TEXTILE PRODUCT AND A METHOD OF MANUFACTURING A COMPOSITE OBJECT THEREFROM

(71) Applicant: The Boeing Company, Chicago, IL (US)

(72) Inventors: Brett I. Lyons, Burien, WA (US); Sergio H. Sanchez, Seattle, WA (US)

(73) Assignee: The Boeing Company, Chicago, IL (US)

( * ) Notice: Subject to any disclaimer, the term of this patent is extended or adjusted under 35 U.S.C. 154(b) by 518 days.

(21) Appl. No.: 15/443,795

(22) Filed: Feb. 27, 2017

(65) Prior Publication Data
US 2018/0245281 A1    Aug. 30, 2018

(51) Int. Cl.
| | |
|---|---|
| *D06M 23/08* | (2006.01) |
| *D06M 23/10* | (2006.01) |
| *B29C 70/12* | (2006.01) |
| *B29C 70/34* | (2006.01) |
| *C08J 5/04* | (2006.01) |

(52) U.S. Cl.
CPC ............ *D06M 23/08* (2013.01); *B29C 70/12* (2013.01); *B29C 70/34* (2013.01); *C08J 5/042* (2013.01); *C08J 2300/22* (2013.01); *C08J 2371/10* (2013.01); *C08J 2377/00* (2013.01); *C08J 2379/02* (2013.01); *C08J 2381/04* (2013.01)

(58) Field of Classification Search
None
See application file for complete search history.

(56) References Cited

U.S. PATENT DOCUMENTS

| | | | |
|---|---|---|---|
| 2014/0050921 A1 | 2/2014 | Lyons et al. | |
| 2015/0148467 A1* | 5/2015 | Greger | C08L 53/025 524/151 |
| 2017/0136694 A1* | 5/2017 | Rezai | B29C 70/56 |

FOREIGN PATENT DOCUMENTS

WO    WO2015177497    * 11/2015

* cited by examiner

*Primary Examiner* — Shawn McKinnon
(74) *Attorney, Agent, or Firm* — Womble Bond Dickinson (US) LLP

(57) ABSTRACT

A textile product and a method of manufacturing a composite object therefrom includes interacting a granular material with a textile material, with the textile material impregnated with the elements of the granular material forming a textile product, and introducing the textile product into a molding process so as to form the composite object therefrom. The granular material includes elements including a matrix material having a plurality of reinforcing fibers received therein, the elements of the granular material having a melt viscosity of between about 5 and about 15 grams per 10 minutes and a particle size distribution with a range in particle size of between about 50 and about 595 micrometers.

20 Claims, 3 Drawing Sheets

302 — INTERACTING A GRANULAR MATERIAL WITH A TEXTILE MATERIAL, THE GRANULAR MATERIAL INCLUDING ELEMENTS COMPRISING A MATRIX MATERIAL HAVING A PLURALITY OF REINFORCING FIBERS RECEIVED THEREIN, THE ELEMENTS OF THE GRANULAR MATERIAL HAVING A MELT VISCOSITY OF BETWEEN ABOUT 5 AND ABOUT 15 GRAMS PER 10 MINUTES AND A PARTICLE SIZE DISTRIBUTION WITH A RANGE IN PARTICLE SIZE OF BETWEEN ABOUT 50 AND ABOUT 595 MICROMETERS, SUCH THAT THE TEXTILE MATERIAL IS IMPREGNATED WITH THE ELEMENTS OF THE GRANULAR MATERIAL TO FORM A TEXTILE PRODUCT

300

304 — INTRODUCING THE TEXTILE PRODUCT INTO A MOLDING PROCESS SO AS TO FORM THE COMPOSITE OBJECT THEREFROM

FIG. 3

TEXTILE PRODUCT AND A METHOD OF MANUFACTURING A COMPOSITE OBJECT THEREFROM

BACKGROUND

Field of the Disclosure

The present disclosure is directed to a textile product and a method of manufacturing a composite object therefrom.

Description of Related Art

Generally, when a granular (e.g., powdered) thermoplastic material is utilized in an additive manufacturing process, such as laser sintering, to produce an object (e.g., a part for an airplane), material properties of unused portions of that granular thermoplastic material change with each iteration of the process due to thermal gradients from the additive manufacturing process. For example, a particle size distribution of the unused granular thermoplastic material is increased after an iteration of laser sintering due to exposure from heat generated by the laser. That is, the heat from the process tends to cause localized melting and consolidation of elements or particles of the granular thermoplastic material, such that some of those particles have a greater average particle size and an associated melt viscosity (e.g., melt flow rate) that is greater than a threshold or maximum melt viscosity and/or average particle size of granular thermoplastic material that is reusable in the additive manufacturing process.

As such, an object manufactured in the additive manufacturing process, from granular thermoplastic materials having material properties that exceed threshold values for reusability, may result in the object having undesirable characteristics. For example, use of granular thermoplastic material having too high of a melt viscosity and/or average particle size in a laser sintering process tends to produce an overly porous object. Accordingly, any of the granular thermoplastic material having a material property change that is not conducive to being reused in an additive manufacturing process or for forming an object therefrom is considered waste material.

In order to prevent such material from being discarded, one approach to reclaiming the granular thermoplastic material includes utilizing the granular thermoplastic material in a separate and discrete object forming process. For example, rotational molding and lamination are two types of object forming processes that are less sensitive to melt viscosity changes and/or average particle size changes in the granular thermoplastic material as compared to laser sintering. However, it is known to those of skill in the art that rotational molding and lamination processes cause distortions in the manufactured object relative to the type of granular thermoplastic material utilized.

Therefore, a need exists for a method of manufacturing a composite object, which is environmentally advantageous and displays improved characteristics of the formed object.

SUMMARY OF THE DISCLOSURE

A textile product and a method of manufacturing a composite object therefrom are disclosed. In some aspects, the textile product comprises a textile material having a woven composition; and a granular material received by and impregnating the textile material, the granular material comprising elements of a matrix material having a plurality of reinforcing fibers received therein, the elements having a melt viscosity of between about 5 and about 15 grams per 10 minutes and a particle size distribution with a range in particle size of between about 50 and about 595 micrometers.

In other aspects, the method of manufacturing the composite object comprises interacting a granular material with a textile material, the granular material including elements comprising a matrix material having a plurality of reinforcing fibers received therein, the elements of the granular material having a melt viscosity of between about 5 and about 15 grams per 10 minutes and a particle size distribution with a range in particle size of between about 50 and about 595 micrometers, such that the textile material is impregnated with the elements of the granular material to form a textile product; and introducing the textile product into a molding process so as to form the composite object therefrom.

In still other aspects, the composite object comprises a textile product comprising a textile material having a woven composition, and a granular material received by and impregnating the textile material, the granular material including elements comprising a matrix material having a plurality of reinforcing fibers received therein, the elements of the granular material having a melt viscosity of between about 5 and about 15 grams per 10 minutes and a particle size distribution with an average range in particle size of between about 50 and about 595 micrometers.

The aspects, functions and advantages discussed herein may be achieved independently in various example implementations/aspects or may be combined in yet other example implementations/aspects, further details of which may be seen with reference to the following description and drawings.

BRIEF DESCRIPTION OF THE DRAWINGS

Figure 1A:
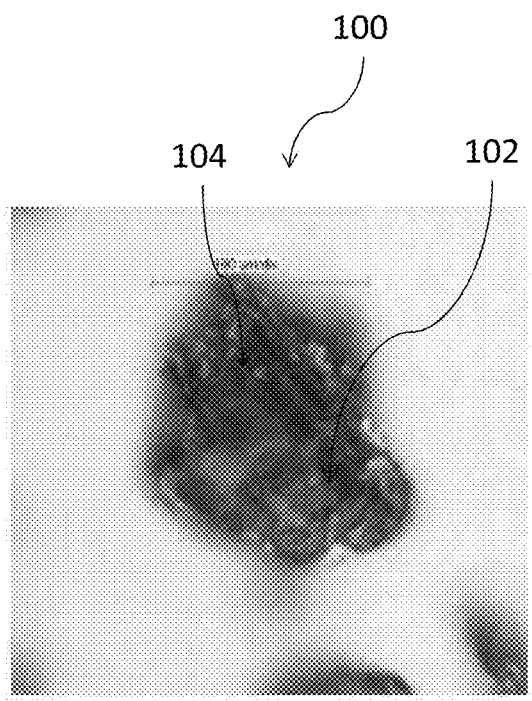
Figure 1B:
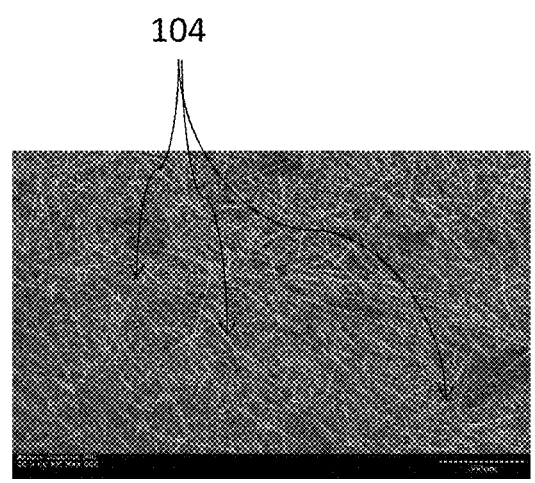
Figure 2:
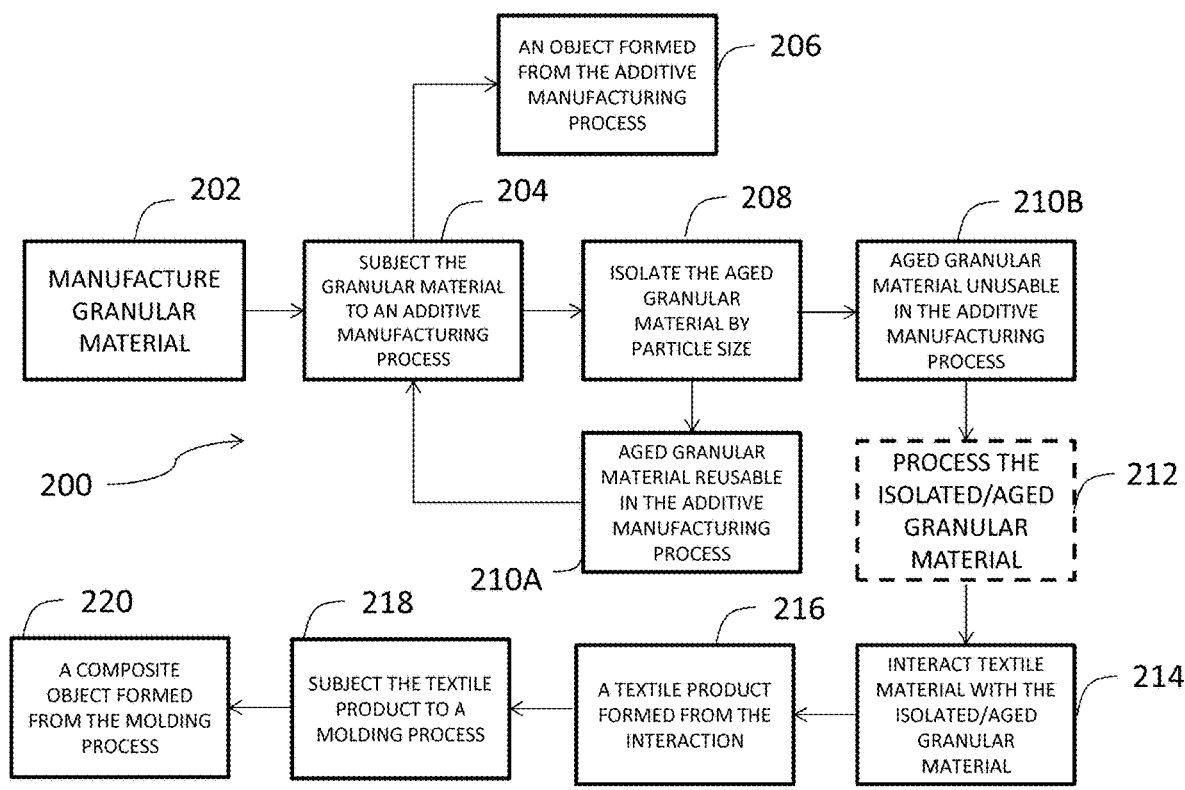

Having thus described the disclosure in general terms, reference will now be made to the accompanying drawings, which are not necessarily drawn to scale, and wherein:

FIG. 1A illustrates an exemplary particle of granular material comprising elements of a matrix material and a plurality of reinforcing fibers according to some aspects of the present disclosure;

FIG. 1B illustrates a plurality of reinforcing fibers according to some aspects of the present disclosure;

FIG. 2 illustrates a flow diagram for an exemplary method of recovering aged granular material from a laser sintering process for integration with a textile material and subsequent use of a textile product formed therefrom in an object forming process according to some aspects of the present disclosure; and FIG. 3 illustrates a flow diagram for an exemplary method of manufacturing a composite object from a textile product according to some aspects of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

As disclosed herein, a textile product and a method of manufacturing a composite object therefrom have applications in the field of aeronautics, as well as other similar fields. In the field of aeronautics, aircraft objects (e.g., aircraft parts, components, elements, etc.) typically have stringent and/or extreme design requirements. These requirements occur from operating environments that have high loads and/or temperatures. Further, these objects are also required to be capable of withstanding impact loads from maintenance, handling, and/or other types of impact loads. For example, some aircraft parts need to survive usage in some airframe locations that have in-service temperature ranges of between about −54 degrees Celsius and about 225 degrees Celsius.

In particular, in some aspects, objects that exist near areas that are heated to or near engine or exhaust temperatures need to be serviced and handled on the ground in severe winter conditions that may be present above 48 degrees north latitude or at altitude. These conditions require such objects to be comprised of a material having sufficient impact resistance at the low end of the temperature range. Simultaneously, sufficient stiffness and mechanical strength must be maintained at the high end of the temperature range to prevent failure in service.

Accordingly, these objects are manufactured in many different ways. One such way includes utilizing a textile material in a molding process. The textile material comprises, in some aspects, broad goods. Broad goods are known in the art as fabrics, tapes, ribbons, and other materials having a plurality of individual reinforcement fibers or filaments bundled together to form a tow, or "flattened" (rather than twisted) yarn. A plurality of tows, in turn, are frequently woven together to form a sheet of reinforcement fibers, the sheet forming one of the various types of broad goods. The broad goods are then able to be used in automated or manual molding processes such as, for example, a laminate molding process, a flake molding process, etc., to form a composite object suitable for use in an aircraft, or the like.

Currently, it is difficult to viably produce drapable broad goods having a plurality of interlaminar discontinuous reinforcing fibers due to the difficulty of grinding polymer (e.g., thermoplastic) powders, which tend to have a fine texture, and the lack of ability in preserving a desired fiber orientation during pre-impregnation of the broad good. The advantages of producing broad goods having a plurality of interlaminar discontinuous reinforcing fibers include improved mechanical properties, improved chemical resistance, etc. As a result and as disclosed herein, it is advantageous to form composite objects from broad goods having discontinuously distributed fiber in interlaminar layers such that thermal and mechanical properties of the objects produced from the broad goods are improved.

Referring now to FIG. 1A, elements of an exemplary aged granular material for manufacturing a composite object (e.g., a part or component for an aircraft) are illustrated. In some aspects and as FIG. 1A illustrates, an exemplary particle of granular material, generally designated 100, comprises a plurality of powder particles including elements comprised of a matrix material 102 having a plurality of reinforcing fibers 104 received therein.

In some aspects, the matrix material 102 comprises a polymer, such as, for example, polyamide (PA), high performance polyamide (PPA), polyphenylene sulfide (PPS), polyetheretherketone (PEEK), polyetherketoneketone (PEKK), polyaryletherketone (PAEK), polyethylenimine (PEI), a blend thereof, or other suitable materials. Where the matrix material 102 comprises a blend, the blend comprises at least one polymer and an additive such as, for example, aluminum, aluminum alloys, titanium, titanium alloys, tungsten, tungsten alloys, vanadium, and vanadium alloys.

In other aspects involving a blend, the polymer of the matrix material 102 is blended with other powder materials. These powder materials include, for example, glass beads, hollow glass spheres, minerals, clays, flame retardant additives, color additives, and/or other suitable materials. In some aspects, a flame retardant (FR) additive is blended with the selected polymers. In such instances, a bromine-containing FR, a metal oxide FR, a phosphate based FR, or other FR chemistries are used. Further FRs are disclosed, for example, in U.S. Pat. No. 8,236,418, the entirety of which is incorporated by reference herein.

The plurality of reinforcing fibers 104, in some aspects, include, but are not limited to carbon fibers, glass fibers, polymer fibers, and nanofibers of various materials. In one aspect, the plurality of reinforcing fibers 104 are obtained from previously processed material, e.g., recycled or repurposed fiber. For example, in one instance the plurality of reinforcing fibers 104 are recycled T800 carbon fibers. Such fiber is available by pyrolysis of reinforced materials and the like, or other recycling methods.

FIG. 1B illustrates the plurality of reinforcing fibers 104, prior to being integrated with the matrix material 102, at a 50× magnification. In some aspects, each of the plurality of reinforcing fibers 104 has a tensile modulus of over 280 MPa. More desirably, in some aspects, each of the plurality of reinforcing fibers 104 has a tensile modulus of over 300 MPa, although other tensile moduli are also contemplated. In some aspects, each of the plurality of reinforcing fibers 104 has a fiber diameter of between about 4 micrometers and about 8 micrometers. In a more particular aspect, each of the plurality of reinforcing fibers 104 has a fiber diameter of between about 4 and 7 micrometers. In yet another aspect, each of the plurality of reinforcing fibers 104 has fiber diameter between about 4.3 micrometers and about 5.6 micrometers.

In some aspects, the plurality of reinforcing fibers 104 of the present disclosure are of a predetermined length and/or have a predetermined length/diameter ratio that is a target value for the matrix material 102 before and/or after the granular material is prepared. In one aspect, a fiber length distribution prior to an additive manufacturing process is represented by an average fiber length of between about 100 micrometers and about 300 micrometers with less than 10 percent of the plurality of reinforcing fibers 104 having a fiber length below 10 micrometers or a fiber length above 750 micrometers. In another aspect, the average fiber length of each of the plurality of reinforcing fibers 104 is about 180 micrometers+/− about 25 micrometers, with less than 5 percent of the fibers having a fiber length below about 50 micrometers or having a fiber length above about 500 micrometers.

Optionally, the plurality of reinforcing fibers 104 are coated to provide various functionality, such as promoting adhesion to the matrix material 102, providing chemically reactive groups bound to the fiber at one end and available for reaction with the matrix material 102 at the other end or in-between ends, etc. The plurality of reinforcing fibers 104 in some aspects are coated, for example, with a thermoset, a thermoplastic, or a metal coating. In one aspect, the fibers are uncoated.

Optionally, the elements of the granular material and/or the components thereof, e.g., the matrix material 102 and/or plurality of reinforcing fibers 104, are selected for a specific intrinsic property. For example, in one instance, the matrix material 102 and/or the plurality of reinforcing fibers 104 are chosen with respect to their absorption profile of all or part of the infrared, visible, near infrared, and/or microwave spectrum of electromagnetic radiation.

After selection of a fiber material and a fiber length/diameter, as well as a type of matrix material, a batch of the granular material is manufactured (see, e.g., step 302, FIG. 3). For example, manufacture of the granular material comprises integrating a fiber (e.g., reinforcing fiber 104, FIG. 1B) with the material matrix (e.g., a matrix material 102, FIG. 1A) using conventional compounding and extruding equipment. In this manner, the fiber length specification in the granular material is controlled. Other techniques for manufacturing the granular material are also contemplated. With the various manufacturing techniques, the plurality of reinforcing fibers are integrated with the matrix material so that the plurality of reinforcing fibers are encapsulated within or otherwise received by the matrix material.

In some aspects, the content of the plurality of reinforcing fibers in the matrix material is between about 5 weight percent and about 99 weight percent, and is preferably between about 10 weight percent and about 75 weight percent, and is even more preferably between about 30 weight percent and about 45 weight percent. Additional information regarding the granular material is found, for example, in U.S. Application Pub. No. 2014/0050921 to Lyons et al., incorporated by reference in its entirety herein.

In some aspects, further processing is performed on the elements (e.g., matrix material 102 and/or the plurality of reinforcing fibers 104) of the granular material before or after integration of the elements. Such further processing includes, for example, a particle size reduction process (e.g., impact-based size reduction, shear based size reduction) that is performed on the elements of the granular material to provide a predetermined particle size distribution of the granular material (or elements thereof).

In other aspects, further processing of the elements of the granular material includes pelletizing, cryo-grinding, shaping, polishing, etc. For example, in one instance, the elements of the granular material are thermo-mechanically polished prior to subjecting the granular material to an additive manufacturing process (e.g., laser sintering). Such polishing is advantageous as it is configured to increase bulk density and dry flow characteristics of the elements of the granular material and provide a granular material having properties that render it suitable for use in further forming processes (e.g., rotational molding).

In another example, the elements of the granular material are blended with other materials. In such an instance, the granular material is blended with a matrix material devoid of a plurality of reinforcing fibers. In a further example, a first granular material is blended with a second granular material. In such an instance, the second granular material and the first granular material comprise elements having different characteristics, such as a plurality of reinforcing fibers of different average fiber lengths and/or fiber diameters of different average diameters.

In a still further example, the elements of the granular material are subjected to cryo-grinding. Cryo-grinding is performed to fracture the matrix material in a manner that prevents heat generation and detrimental effects to the matrix material and prevents further dimensional change to the plurality of reinforcing fibers or their relative orientation within the matrix material such that a free-flowing granular material is obtainable.

FIG. 2 illustrates a flow diagram, generally designated 200, for a method of recovering aged granular material from a laser sintering process, wherein the aged granular material is subsequently subject to integration with a textile material, and subsequent use of the textile product formed from the textile material and the aged granular material in a molding process. In a first step, 202, granular material such as that described above in reference to FIGS. 1A-1B is manufactured. Such manufacture includes, in some aspects, integrating a selected matrix material (e.g., matrix material 102, FIG. 1A) with a plurality of reinforcing fibers (e.g., plurality of reinforcing fibers 104, FIG. 1A) such that the plurality of reinforcing fibers are encapsulated by or otherwise received within the matrix material. Elements of the granular material are selected according to different material properties that each element of the overall particle will impart on the final manufactured object. For example, in one instance, the granular material comprises PEKK encapsulated carbon fibers, having a melting point greater than about 300 degrees Celsius.

In a second step, 204, the manufactured granular material is subjected to an additive manufacturing process. For example, the additive manufacturing process is selective laser sintering, selective laser melting, etc. In these examples, the granular material is distributed in layers and selectively heated by an energy source. Accordingly, in step 206, a three-dimensional object is formed from a build-up of the heated layers of the granular material.

However, in some aspects, not all of the granular material subjected to the additive manufacturing process in step 204 is incorporated into the object formed by the additive manufacturing process in step 206. Accordingly, this leftover granular material is recycled, reclaimed, repurposed, or reused in the additive manufacturing process, or is considered waste material and discarded, depending on material property changes that have occurred in the elements of the granular material as a result of being included in the additive manufacturing process.

Exposure of such granular material to concentrated heat or energy during an additive manufacturing is associated with elements of the granular material undergoing a change in one or more material properties, such that the granular material subject to a particular thermal history is considered "aged." By comparison, "virgin" granular material is the granular material that has not been subjected to such heat or energy, for example, during an additive manufacturing process, and wherein the elements of the granular material have not undergone a change in the one or more material properties. Such material property changes to the aged elements of the granular material disclosed herein include, for example (but not limited to), a change in melt viscosity, a change in a particle size distribution and/or a change in average particle size within the particle size distribution, a change in specific enthalpy, a change in a properties of the reinforcing fiber (e.g., fiber length, fiber diameter, fiber orientation), a change in fiber content in consolidated particles, a change in a coefficient of thermal expansion, a change in heat of crystallization, and the like.

In some aspects, the change in the material properties of the elements of the aged granular material are sufficiently minor that the aged granular material is able to be reused in the additive manufacturing process. More particularly, particles of the aged granular material that meet certain threshold criteria, such as, for example, are less than a threshold average particle size, are able to be reused in the additive manufacturing process in step 204. Thus, the elements of the aged granular material are analyzed in order to determine the material properties thereof. For example, a non-destructive analysis relying on electromagnetic radiation, sound, microscopy, etc., is used in order to analyze the elements of the granular material.

In this manner, in step 208, elements of the aged granular material meeting certain threshold values are isolated from elements of the granular material not meeting the threshold values. Notably, the threshold values prevent aged granular material having undesirable material properties from being re-used for manufacturing an object in the additive manufacturing process and thereby imputing those undesirable properties to or causing other undesirable effects in the finished object. For example, in one instance, it is desirable for the elements of the granular material reused in the additive manufacturing process to have a particle size distribution of between about 20 micrometers and about 150 micrometers with an average particle size of between about 75 micrometers and about 125 micrometers in order to prevent excessive porosity in a part or object formed therefrom.

In some aspects, isolation in step 208 is accomplished using a mechanical sifting process. For example, in one instance, a vibratory sifting mechanism is configured with a screen having an aperture size capable of isolating and removing particles having an average particle size of greater than about, for example, 50 micrometers. Accordingly, in step 210A, the aged granular material to be reused in the additive manufacturing process in step 204 comprises elements having lesser particle sizes (e.g., elements in a range in particle size of between about 20 micrometers and about 150 micrometers) across an increased particle size distribution, which are isolated from greater particle size elements (e.g., elements in a range in particle size of between about 50 micrometers and about 595 micrometers) within the increased particle size distribution prior to reuse. Generally, in some aspects and based on such exemplary criteria, between about 30 percent and about 70 percent of the aged granular material (i.e., having an average particle size of 50 micrometers or less) is reusable in the additive manufacturing process in step 204.

Consequently, in step 210B, the granular material to be discarded or not reused in the additive manufacturing process includes elements having a range in particle size of between about 50 micrometers and about 595 micrometers, as well as a melt viscosity of between about 5 and about 15 grams per 10 minutes, a specific enthalpy of first melt of between about 40 and about 50 Joules per gram, a coefficient of thermal expansion of about 50 micrometers per millimeter per degrees Celsius, and/or a heat of crystallization greater than about 40 Joules per gram. More particularly, in one example, a $90^{th}$ percentile of the particles of the exemplary aged granular material within the particle size distribution have an average particle size of between about 150 and about 595 micrometers, while a $10^{th}$ percentile of the particles of the exemplary aged granular material within the particle size distribution have an average particle size of between about 50 and about 150 micrometers. In this instance, an average particle size is between about 80 micrometers and about 200 micrometers.

Moreover, the aged granular material in step 210B comprises a plurality of reinforcing fibers encapsulated by the matrix material, wherein the fibers are distributed within each particle of the granular material in a predominantly random orientation (see, e.g., 104, FIG. 1A) such that the particle demonstrates essentially anisotropic properties in at least two dimensions. In some aspects, a reinforcing fiber content of each particle of the exemplary aged granular material is between about 20 and about 50 percent by weight; preferably about 23 percent by weight. In some aspects, an average fiber length of the plurality of reinforcing fibers is between about 100 micrometers and about 500 micrometers, while an average fiber diameter of the plurality of reinforcing fibers is between about 4 micrometers and about 8 micrometers.

In step 212, the aged and isolated granular material from step 210B is optionally processed. For example, in one instance, this isolated granular material is sifted to remove any sacrificial or melted particles remaining from the additive manufacturing process in step 204. In another example, the isolated granular material is further resized to a substantially uniform average particle size such that only the granular material meeting a threshold value (i.e., a threshold average particle size) is used in the molding process in step 218. For example, the isolated granular material (i.e., the greater particle size elements) is resized to a substantially uniform average particle size of between about 80 micrometers and about 200 micrometers.

In step 214, the isolated granulated material is interacted with a textile material such that the textile material is impregnated with the elements of the aged and isolated granular material. More particularly, for example, the aged and isolated granular material comprises elements including a matrix material having a plurality of reinforcing fibers received therein, the elements of the granular material being having a melt viscosity of between about 5 and about 15 grams per 10 minutes and a particle size distribution with a range in particle size of between about 50 and about 595 micrometers.

In some aspects, the textile material is a broad goods material including, for example, tapes, ribbons, bands, fabrics, etc. The broad goods material comprises, in some aspects, a woven composition of one or more of fiberglass fibers, carbon fibers, polymer fibers, etc. In some aspects, other additives such as FR additives, color additives, and/or other suitable materials, are included in the composition of the textile material.

As disclosed herein, "interacting" the textile material with the isolated and aged granular material comprises integrating or impregnating the textile material with the isolated and aged granular material so that a textile product is formed therefrom, in step 216. Such methods for impregnating the textile material with the isolated and aged granular material include, for example, (but not limited to) electrostatically applying the aged and isolated granular material to the textile material and curing the textile material having the aged and isolated granular material applied thereon under heat, introducing the aged and isolated granular material into a suspension and heating and spraying (e.g., thermally spraying) the suspension onto the textile material, vaporizing the aged and isolated granular material and allowing the vapor to condense onto the textile material, and pressing the aged and isolated granular material into the textile material with a heated platen. In this way, in step 216, a granular material-impregnated textile material or "textile product," or otherwise a "textile product" having a plurality of encapsulated, discontinuous reinforcing fibers distributed throughout, is provided. Such a textile product exhibits improved material properties relative to textile products devoid of the exemplary aged and isolated granular material disclosed herein. Such improved properties include, for example, improved drapability of the textile product, lower melting point, etc.

In step 218, the textile product is subjected to a molding process so as to form a composite object therefrom. For example, in some aspects, the molding process is a laminate molding process, a flake molding process, or the like that is performed either manually or automatically by a control device (not shown).

In step 220, a composite object (e.g., aircraft part) is formed from the molding process. For example, the composite object comprises a textile product comprising a textile material having a woven composition, and a granular material received by and impregnating the textile material, the granular material including elements comprising a matrix material having a plurality of reinforcing fibers received therein, the elements of the granular material having a melt viscosity of between about 5 and about 15 grams per 10 minutes and a particle size distribution with an average range in particle size of between about 50 and about 595 micrometers. As compared with objects formed from a molding process using traditional textile materials, the composite object disclosed herein comprises a lower coefficient of thermal expansion (e.g., less than about 50 micrometers per millimeter per degree Celsius, and preferably less than about 40 micrometers per millimeter per degree Celsius) that reduces cracking of the formed object.

Reference is now being made to FIG. 3, which illustrates a method flow diagram, generally designated 300, of a method of manufacturing a composite object from a textile product.

In step 302, a granular material is interacted with a textile material such that the textile material is impregnated with the elements of the granular material to form a textile product. In some aspects, the granular material includes elements comprising a matrix material having a plurality of reinforcing fibers received therein, the elements of the granular material having a melt viscosity of between about 5 and about 15 grams per 10 minutes and a particle size distribution with a range in particle size of between about 50 and about 595 micrometers. The aged granular material utilized in step 302 comprises the exemplary aged and isolated granular material having the characteristics described above in reference to FIG. 2, step 212.

In step 304, the textile product (see, e.g., FIG. 2, step 216) is introduced into a molding process so as to form the composite object therefrom.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that equivalents, modifications, and other aspects are intended to be included within the scope of the appended claims. Although specific terms are employed herein, they are used in a generic and descriptive sense only and not for purposes of limitation.

That which is claimed:

1. A method of manufacturing a composite object, the method comprising:
aging a virgin granular material by subjecting the virgin granular material at least to heat in a first manufacturing process to form an aged granular material, the aged granular material including elements comprising a matrix material having a plurality of reinforcing fibers received therein, the elements of the aged granular material having, as a result of the first manufacturing process: a melt viscosity of between about 5 and about 15 grams per 10 minutes, the melt viscosity being decreased relative to the virgin granular material not subjected to the first manufacturing process, and a particle size distribution with a range in particle size of between about 50 and about 595 micrometers, with the particle size distribution spanning at least 300 micrometers, the particle size distribution of the elements of the aged granular material being increased in response to the heat applied thereto in the first manufacturing process;
interacting the aged granular material with a textile material having a woven composition in a second manufacturing process so that the aged granular material is received by and impregnates the textile material to form a textile product; and
introducing the textile product into a molding process so as to form the composite object therefrom.

2. The method according to claim 1, wherein the elements of the aged granular material have a specific enthalpy of first melt of between about 40 and about 50 Joules per gram and a heat of crystallization greater than about 40 Joules per gram.

3. The method according to claim 1, wherein interacting the aged granular material with the textile material comprises interacting the aged granular material with the textile material, the plurality of reinforcing fibers received in the matrix material having an average fiber length of between about 100 micrometers and about 500 micrometers and an average fiber diameter of between about 4 micrometers and about 8 micrometers, and wherein a fiber content of the plurality of reinforcing fibers in the aged granular material is between about 20 and about 50 percent by weight.

4. The method according to claim 1, wherein aging the virgin granular material comprises heating the virgin granular material in the first manufacturing process to affect the increase in the particle size distribution of the elements of the aged granular material such that the increased particle size distribution comprises an average particle size of between about 80 and about 200 micrometers.

5. The method according to claim 1, comprising isolating greater particle size elements of the aged granular material within the increased particle size distribution and associated with the melt viscosity of between about 5 and about 15 grams per 10 minutes from lesser particle size elements of the aged granular material within the increased particle size distribution.

6. The method according to claim 5, wherein isolating the greater particle size elements of the aged granular material comprises sifting the elements of the aged granular material to separate the lesser particle size elements for reusing in the additive manufacturing process from the greater particle size elements, for interacting with the textile material.

7. The method according to claim 6, comprising resizing the greater particle size elements to a substantially uniform average particle size.

8. The method according to claim 5, wherein interacting the aged granular material with the textile material comprises dispersing the elements of the aged granular material throughout the textile material using one of: applying the aged and isolated granular material to the textile material and curing the textile material having the aged and isolated granular material applied thereon under heat, introducing the aged and isolated granular material into a suspension and heating and spraying the suspension onto the textile material, vaporizing the aged and isolated granular material and allowing the vapor to condense onto the textile material, and pressing the aged and isolated granular material into the textile material with a heated platen to thereby form the textile product.

9. The method according to claim 1, wherein interacting the aged granular material with the textile material comprises interacting the aged granular material with a broad goods material.

10. The method according to claim 1, wherein introducing the textile product into the molding process comprises introducing the textile product into a laminate molding process or a flake molding process so as to form the composite object therefrom.

11. A textile product comprising:
a textile material having a woven composition; and
an aged granular material received by and impregnating the textile material, the aged granular material being formed from a virgin granular material subjected at least to heat in a first manufacturing process, and including elements comprising a matrix material having a plurality of reinforcing fibers received therein, the elements of the aged granular material having, as a result of the first manufacturing process;
a melt viscosity of between about 5 and about 15 grams per 10 minutes, the melt viscosity being decreased relative to the virgin granular material not subjected to the first manufacturing process, and
a particle size distribution with a range in particle size of between about 50 and about 595 micrometers, with the particle size distribution spanning at least 300 micrometers, the particle size distribution of the elements of the aged granular material being increased in response to the heat applied thereto in the first manufacturing process,
wherein the aged granular material is subjected to a second manufacturing process so as to impregnate the textile material and form the textile product.

12. The textile product according to claim 11, wherein the plurality of reinforcing fibers received in the matrix material have an average fiber length of between about 100 micrometers and about 500 micrometers and an average fiber diameter of between about 4 micrometers and about 8 micrometers, and wherein a fiber content of the plurality of reinforcing fibers in the aged granular material is between about 20 and about 50 percent by weight.

13. The textile product according to claim 11, wherein the increased particle size distribution comprises an average particle size of between about 80 and about 200 micrometers.

14. The textile product according to claim 11, wherein the elements of the aged granular material received by and impregnating the textile material comprise greater particle size elements relative to lesser particle size elements within the increased particle size distribution, the greater particle size elements of the aged granular material being associated with the melt viscosity of between about 5 and about 15 grams per 10 minutes being isolated from the lesser particle size elements of the aged granular material, for impregnating the textile material.

15. The textile product according to claim 11, wherein the aged granular material is received by and impregnates the textile material in response to using one of:
applying the aged and isolated granular material to the textile material and curing the textile material having the aged and isolated granular material applied thereon under heat, introducing the aged and isolated granular material into a suspension and heating and spraying the suspension onto the textile material,
vaporizing the aged and isolated granular material and allowing the vapor to condense onto the textile material, or
pressing the aged and isolated granular material into the textile material with a heated platen to thereby form the textile product.

16. The textile product according to claim 11, wherein the textile material comprises a broad goods material.

17. A composite object comprising:
a textile product comprising a textile material having a woven composition, and an aged granular material received by and impregnating the textile material, the aged granular material being formed from a virgin granular material subjected at least to heat in a first manufacturing process, and including elements comprising a matrix material having a plurality of reinforcing fibers received therein, the elements of the aged granular material having, as a result of the first manufacturing process;
a melt viscosity of between about 5 and about 15 grams per 10 minutes, the melt viscosity being decreased relative to the virgin granular material not subjected to the first manufacturing process, and
a particle size distribution with a range in particle size of between about 50 and about 595 micrometers, with the particle size distribution spanning at least 300 micrometers, the particle size distribution of the elements of the aged granular material being increased in response to the heat applied thereto in the first manufacturing process, wherein the aged granular material is subjected to a second manufacturing process so as to impregnate the textile material and form the textile product.

18. The textile product according to claim 11, wherein the elements of the granular material have a specific enthalpy of first melt of between about 40 and about 50 Joules per gram and a heat of crystallization greater than about 40 Joules per gram.

19. The textile product according to claim 11, wherein the increased average range in particle size spans at least 500 micrometers.

20. The composite object according to claim 17, wherein the elements of the granular material have a specific enthalpy of first melt of between about 40 and about 50 Joules per gram and a heat of crystallization greater than about 40 Joules per gram.

* * * * *